United States Patent
Hanks et al.

(10) Patent No.: US 6,707,829 B1
(45) Date of Patent: Mar. 16, 2004

(54) ENHANCED AUTOMATIC TIMING ADJUSTMENT FOR ALTERNATE ROUTING OF HFC SYSTEMS

(75) Inventors: Gina Hanks, Carol Stream, IL (US); William A. Felderman, Cary, IL (US); Timothy M. Burke, Norton, MA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/473,344

(22) Filed: Dec. 28, 1999

(51) Int. Cl.$^7$ ................................................. H04J 1/14
(52) U.S. Cl. ............................................ 370/519; 714/2
(58) Field of Search ................................. 370/216, 503, 370/512, 519; 714/2, 20

(56) References Cited

U.S. PATENT DOCUMENTS

| | | | | |
|---|---|---|---|---|
| 5,636,208 A | * | 6/1997 | Chang et al. | 370/347 |
| 5,740,166 A | * | 4/1998 | Ekemark et al. | 370/331 |
| 5,790,533 A | * | 8/1998 | Burke et al. | 370/318 |
| 5,818,825 A | * | 10/1998 | Corrigan et al. | 370/329 |
| 6,130,875 A | * | 10/2000 | Doshi et al. | 370/225 |
| 6,275,468 B1 | * | 8/2001 | Burke et al. | 370/228 |

* cited by examiner

Primary Examiner—Hassan Kizou
Assistant Examiner—Dmitry Levitan
(74) Attorney, Agent, or Firm—Mayer Fortkort & Williams, PC; Karin L. Williams (57) ABSTRACT

A telephony system 10 having automatic timing adjustment for diverse routing of HFC systems has a signal stream routing through a signal line loop between a head-end 120 and at least one communication unit 16, i.e., a cable modem cable access unit (CAU). If a fault occurs within the signal line loop, recognized by the head-end 120 when a short uplink burst from the communication unit 16 does not align within a predetermined timing window based on a value in the database, the head-end will adjust the cycle through predetermined delay parameters, corresponding to various alternate signal line loops made up of redundant signal lines. An information processor is provided at the head-end 120 of the HFC system 10 for automatically adjusting the timing of the signal stream in order to maintain the database determined at the information processor at the head-end 120. The timing adjustment of the signal stream is communicated between the head-end 120 and the communication units, CAUs 16.

13 Claims, 5 Drawing Sheets

ENHANCED AUTOMATIC TIMING ADJUSTMENT FOR ALTERNATE ROUTING OF HFC SYSTEMS

FIELD OF THE INVENTION

This present invention relates in general to wireline communication links, and in particular to timing adjustment of communication signals between multiple subscriber units communicated over a public switch telephone network with a communications network including a hybrid fiber coax (HFC) cable distribution network.

BACKGROUND OF THE INVENTION

Several cable telephony systems have been proposed for combining telephony, video, and data information over a cable distribution network taking advantage of the existing high bandwidth capabilities of cable television (CATV) operators which have an existing HFC distribution network to subscriber premises that could carry such diverse services. In a wireline communication system, a single trunk line will service many different individual users. For instance, a telephony system will often have various trunk lines fanning out from a main control/switching station, and each of these will run from a head-end (control station and switching network) to a service area node. Many different users will be fed to the node and then networked onto the trunk line.

Trunk lines are typically fiber optic cables which are capable of carrying a tremendous number of calls which carry signals at speeds much greater than conventional metal lines. Telephony cable lines, whether optic or metal, operate in pairs such that a trunk line will consist of a downstream cable and an upstream cable forming signal line loops for the telephony signal streams to follow. Telephony employing cable modem technology combines telephony, video, and data signals over a cable distribution infrastructure. Generally the up and downstream cables are installed along the same route and have the same length, although not necessarily installed in the same trench or on the same utility line. However, these main up and downstream lines generally parallel each other.

A major goal of telephony systems is to supply dependable use to users so that the system may be accessed even during emergencies. To be reliable, the system must have a backup transport with an alternate route to ensure that communications continue even if one of the paths is destroyed. When a line goes down, a fault is registered within the system indicating that the signal stream cannot be routed through the main signal line loop. A line can go down for many reasons including natural forces causing a break in the line, construction digging into the area where a line is laid and breaking the line, maintenance on the line by the operator, and any other number of occurrences. Accordingly, operators of telephony systems install redundant trunk lines so that the telephony signal streams may be routed through the redundant trunk lines to form an alternate signal line loop. Generally there will be a designated downstream redundant line and a designated upstream redundant line. If the main, or signal line loop downstream line is broken or dysfunctional, the head-end will route the signal stream through the redundant downstream line while using the upstream line of the main, or signal line loop. Similarly, the redundant upstream line may be used in a similar manner. In fact, any combination of the four lines may be used by the head-end.

Although any combination of the four lines may be used, it should be noted that the two main lines (down and upstream) of the signal line loop usually follow the shortest path from the head-end to the service node. For reliability reasons, the redundant lines must follow a different path, often making broad detours resulting in much longer lines than the signal loop lines. Therefore, if a line of the signal line loop is near a construction site, for instance, and capable of being damaged by digging at the site, the redundant line will not be affected since its routing is away from the same area.

The longer length of the redundant line naturally delays the time that the signal stream will take to go from the head-end to the service node and back. This presents a problem with time based signaling protocols such as time division multiple access (TDMA) protocols. Delaying the time a signal stream takes to go to the service node and back beyond the delay expected as the signal follows the main signal line loop alters the anticipated position of the signal stream and control information within the stream once the signal stream returns to the head-end. Communication links are lost and an adjustment must take place to align the signal stream from the service node to the head-end to a position in the protocol that the head-end will be expecting the signal stream to be in.

Various problems associated with HFC distribution systems are attendant with the timing adjustment for alternate routing associated with multiple delay paths in a redundant communications system. For instance, it would be desirable to eliminate the need for measurement of the four delay paths which result in a disruption in the system when a fiber switch occurs, or through the introduction of human error associated with the delay measurement and adjustment. Automatic time alignment measurement to provide a time alignment window automatically centered to accommodate the nearest and farthest subscriber units may provide a better margin of error when parametric variations occur through cable stretching and temperature variations. It would be further desirable to provide the time alignment window as being adjustable to provide the correct value from any subscriber unit which sends shortened uplink bursts (SUBs). The provision of the time alignment window, once done after a detection, may facilitate a desirable rate for establishing communications, so as to avoid numerous tries which may result in lost calls during high traffic conditions. To this end, it would be further desirable to be able to report when a subscriber unit has been placed on the cable network which goes past the capability of the system, so as to automatically identify the subscriber unit outside of the time alignment window, and avoid a disruption in service to the other subscriber units on the system.

Accordingly, a method is needed in a telephony system having redundant signal lines to automatically detect when a fault in a signal line loop has occurred, and then automatically compensate for any delays caused by routing the signal stream through the redundant signal line.

Accordingly, it would be desirable to provide enhanced automatic timing adjustments for alternate routing of the HFC cable distribution network for telephony between multiple subscriber units on a cable distribution network over a public switch telephone network on a communications network backbone.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF THE PREFERRED EMBODIMENTS

Figure 1:
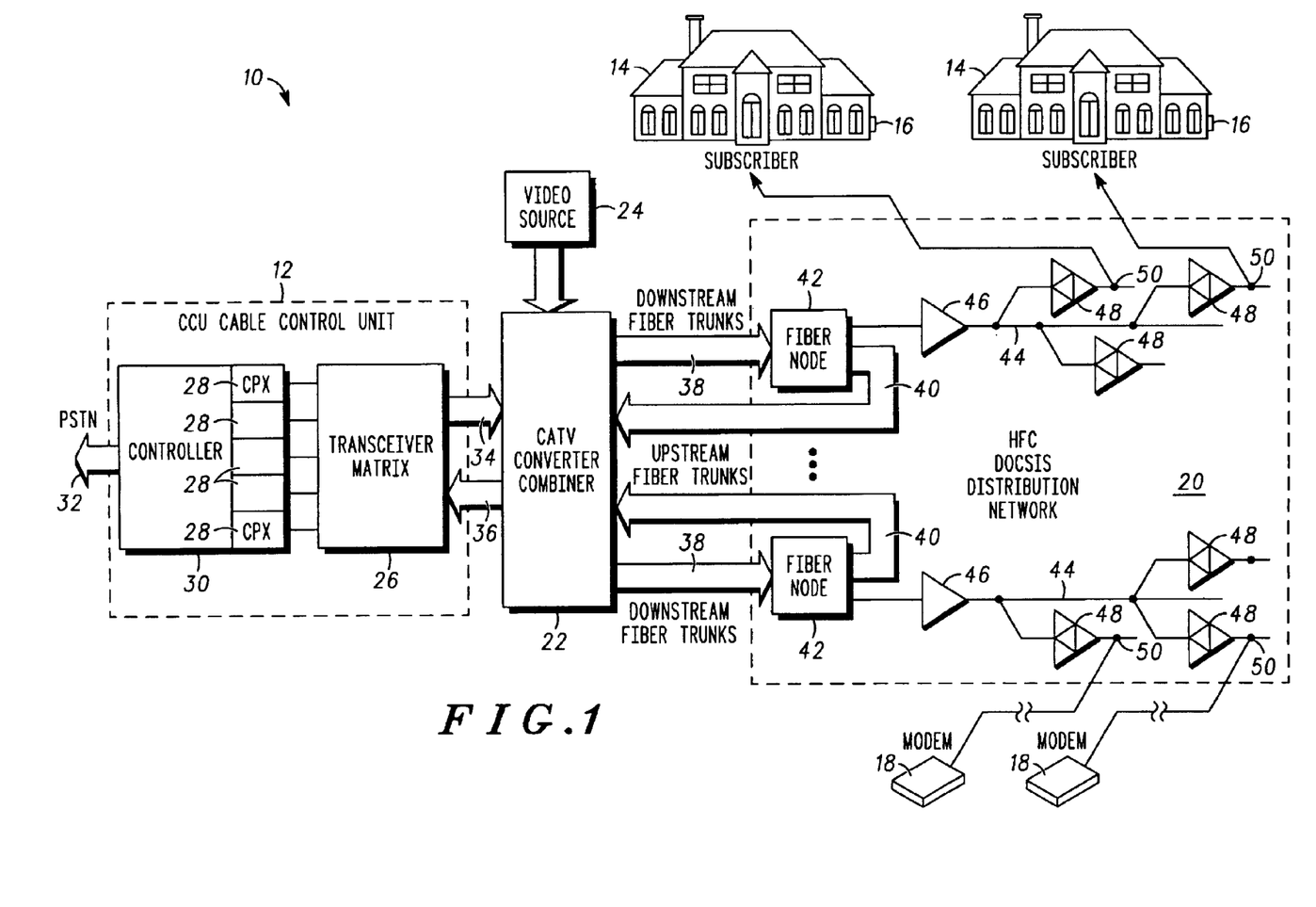
FIG. 1 is a diagram of a communications system in which the present invention may be implemented.

Reference will now be made in detail to the present embodiments of the invention. As depicted in FIG. 1, a communications system 10 shows a cable telephone system in block diagram form which employs coaxial cable for standard cable television (CATV) connected to subscriber premises. The communication system 10 allows multiple subscribers to access telephony on demand. The following description begins with an overview of the communication system 10, describing the operation of the headend backbone and routers located at the cable company headend, and then the electronics in the cable telephony unit 16 or desktop cable modem 18 which would be located at the subscriber premises, e.g., a home or business 14. A communication system 10 as described, employs methods of time division multiplex (TDM) telephony on a cable distribution network 20 for telephony information between multiple subscriber units 16,18 communicated over a public switch telephone network (PSTN) 32 with at least one router.

The communication system 10 is an example of a basic cable backbone architecture which employs a hybrid fiber coax (HFC) cable system using a combination of fiber and coaxial cable to distribute information services to subscriber units at the customer premises. Of course, alternate embodiments of the communication system 10 may incur other suitable communications medium as part of the distribution network.

This type of fiber coax system provides a telephone system over cable based on a Cable Access Communications System (CACS) protocol, and the primary technology used is time division multiplex (TDM), although many other technologies may be used. To provide more channels to increase the number of users that may operate on a cable telephony communications system, TDM provides time division multiple access (TDMA) in which users share a carrier frequency in the communications system by being assigned and using one at a time, for a limited amount of time, time division multiplex channels (time slots). In effect, each user gets assigned a different time slot on the same frequency. In this way many users can share the same frequency. Data transmissions are sent in time slots in which a communications unit may be assigned a particular time slot only for a limited amount of time.

TDM delivers data from the headend out to the cable access units, as a constant bit stream, time-slotted for CACS in eight (8) time slots per frame, with each RF carrier being transmitted downstream out to cable access units which can support up to eight (8) simultaneous conversations, where each time slot out of one frame is dedicated to a call. The upstream is Time Division Multiple Access (TDMA) from the CAU 16 to allow multiple subscribers to signal into the CCU 12. Thus, the CAU 16 is assigned a time slot, one of eight within a frame, synchronized for data transmission in the upstream path. In a very large cable system however, the system must allow for substantial levels of propagation delay. For example, the CAU 16 may be 20 to 200 kilometers away from the headend, and thus propagation delay becomes a significant factor, which delay may also be variable. To compensate for the delay, the expected arrival time for all data bursts is equalized for both the cable access unit and the headend, directly relative to the distance over the fiber. Propagation through fiber runs about 60 percent of the speed of light, and thus a factor programmed into the equipment in essence delays everything to align with the expected arrival time of that data.

The problem however is where multiple fibers serve a neighborhood, which is the usually the case in a design for high availability. In an embodiment with only one fiber running from the headend out to the neighborhood, all the service is lost to the neighborhood when a backhoe is digging in the vicinity and cuts the fiber. The entire system therefore provides a redundant fiber, i.e., an alternate route, for servicing the neighborhood. One of the requirements however is that one should not place a redundant fiber in the same sheath as the other fiber, because a physical disruption of one cable should not affect the other cable. Thus, the standard practice is to run the fiber some other route. Accordingly, a direct fiber that goes from the headend out to the neighborhood, e.g., a kilometer away, while the main fiber link is only a kilometer, another redundant fiber link going to the same neighborhood taking some other branch may be ten (10) kilometers in length to provide two paths to feed the neighborhood. The equipment must then be able to compensate very quickly in the case of a fiber cut for propagation delay to prevent calls from being dropped due to transmission delays. To maintain service then, the system detects the fact that a fiber has been killed or cut and automatically switches over to the alternate fiber and in the process provides a whole new compensation over time, i.e., the delay time with automatic timing adjustment for diverse routing. This significantly facilitates a solution for providing high availability service for telephony in the HFC or cable type of system.

With reference to FIG. 1, a diagram of a communications system is illustrated in which the present invention may be implemented. Communications system 10 is an example of a basic cable system architecture that is a hybrid fiber/coaxial cable (HFC) system using a combination of fiber and coaxial cable to distribute subscriber services to customer premises equipment. Alternatively, communications system 10 may consist entirely of coaxial cable, fiber, or other suitable communications medium. Regardless of the cable infrastructure, a cable branch will serve a distribution area shared by a community of subscribers. In the depicted example, communications system 10 is a cable telephony communications system that provides telephone services along with cable television services on an HFC television infrastructure.

Communications system 10 includes a cable control unit (CCU) 12 or some other base communications unit that is connected to subscriber 14 by a distribution network 20 and a combiner 22. The CCU is a portion of the equipment at the cable company headend that sends and receives telephone calls to and from the home subscribers. Combiner 22 also has an input for video sources 24. CCU 12 also includes cable port transceivers (CPXs) 28 which are connected to combiner 22. These cable port transceivers generate downstream carrier channels in communications system 10. "Downstream" or "downlink" as used in this description refers to radio frequency (RF) signals going to the subscriber homes. "Upstream" or "uplink" as used in this description refers to RF signals going from the subscriber to the headend.

Combiner 22 receives modulated RF carriers from video sources 24 and from CPXs 28 in CCU 12 and sums these signals together to be sent over distribution network 20. CPXs 28 are controlled by a controller 30 which provides all functions necessary to support the data link portion of the system. The "data link portion" refers to the ability for the system to carry phone calls in the form of digital data, as well as any other communications in the form of digital data. The headend of the communications system typically includes CCU 12, combiner 22, and video sources 24. A digital switch may be in a remote location from the headend or may be located at the headend itself. These components are the headend equipment responsible for providing access and management of services to the cable system 10 servicing multiple subscribers. The controller 30 of the CCU 12 is connected to the digital switch through carrier facilities, such as T1 or E1, which is connected to the public switching telephone network (PSTN) 32. The digital switch may be, for example, a class 5 TELCO switch.

Transmissions from CCU 12 in distribution network 20 are facilitated by downstream fiber trunks 38 and upstream fiber trunks 40. These fiber trunks are fiber optic cables and are connected to fiber nodes 42. Fiber nodes 42 perform directional conversion between the optical domain of fiber optical cable and the electrical domain of coaxial cable in distribution network 20. Each fiber node 42 has a connection to at least one serving area 44. In the depicted example, serving area 44 comprises coaxial cable and includes trunk amplifiers 46, which are bi-directional amplifiers in the depicted example. Additionally, bi-directional line extenders 48 are located near taps 50 which are connected to cable access units (CAUs) 16 located at subscriber 14. These CAUs are also called "subscriber communications units".

CCU 12 is used to provide telephony (as well as other digital data communications) in communications system 10. Additionally, CCU 12 controls the cable spectrum, infrastructure resources, and services for all CAUs 16 on a serving area, as well as managing multiple serving areas. CAUs 16 provide telephone and television services at subscriber premises. Typically, a CAU is mounted on the side of the subscriber's home, or on an unintrusive place, such as a basement or attic. The CAU 16 manages the uplink and downlink communications paths and transports cable television channels to the subscriber's television. For example, "A plain old telephone" (POTS) at the subscriber's home plugs into the CAU 16. The CAU 16 puts the phone signals from the POTS on to the cable system. Additionally, the CAU 16 takes phone calls off the cable system and forwards them to the POTS, as well as taking regular cable TV signals off the cable and passing them along to the subscriber's TV.

Figure 2A:
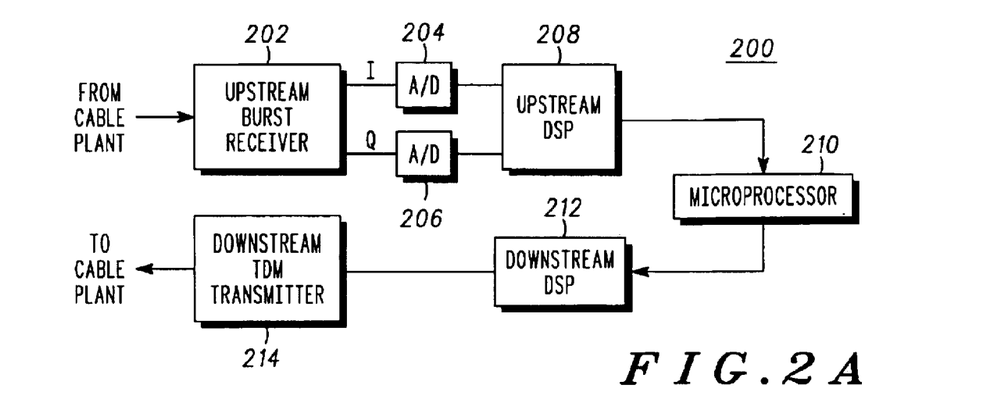
FIG. 2A is a block diagram of components in a cable control unit (CCU) according to the present invention.

Turning next to FIG. 2A, a block diagram of components in a CCU control unit is depicted according to the present invention. In CCU 200, upstream burst receiver 202 receives a TDMA burst from a CAU and converts the burst to baseband quadrature I and Q signals. A "burst" is a fixed transmission of data in bits bearing information. The burst is π/4-DQPSK modulated. These baseband I and Q signals are converted to a digital signal by analog to digital (A/D) converters 204 and 206 and processed by upstream digital signal processor (DSP) 208. In the depicted example, A/D converters 204 and 206 are 8-bit A/D converters. Upstream DSP 208 sends the processed information to microprocessor 210.

Microprocessor 210 sends messages back to the CAU through downstream DSP 212 and downstream TDM transmitter 214, which is connected to the communications network on which the CAU is located.

Upstream burst receiver 202, A/D converters 204 and 206, upstream DSP 208, microprocessor 210, downstream DSP 212, and downstream transmitter 214 are components found in CPXs 28 in FIG. 1. The downstream components depicted in FIG. 2A may be in the same transceiver or a different transceiver (CPX) from the upstream components illustrated. Upstream DSP 208, microprocessor 210, and downstream DSP 212 make up a processing unit in FIG. 2A. Microprocessor 210 is found in controller 30 in FIG. 1. This microprocessor and the DSPs in CPXs 28 form the processing unit in CCU 12.

Figure 2B:
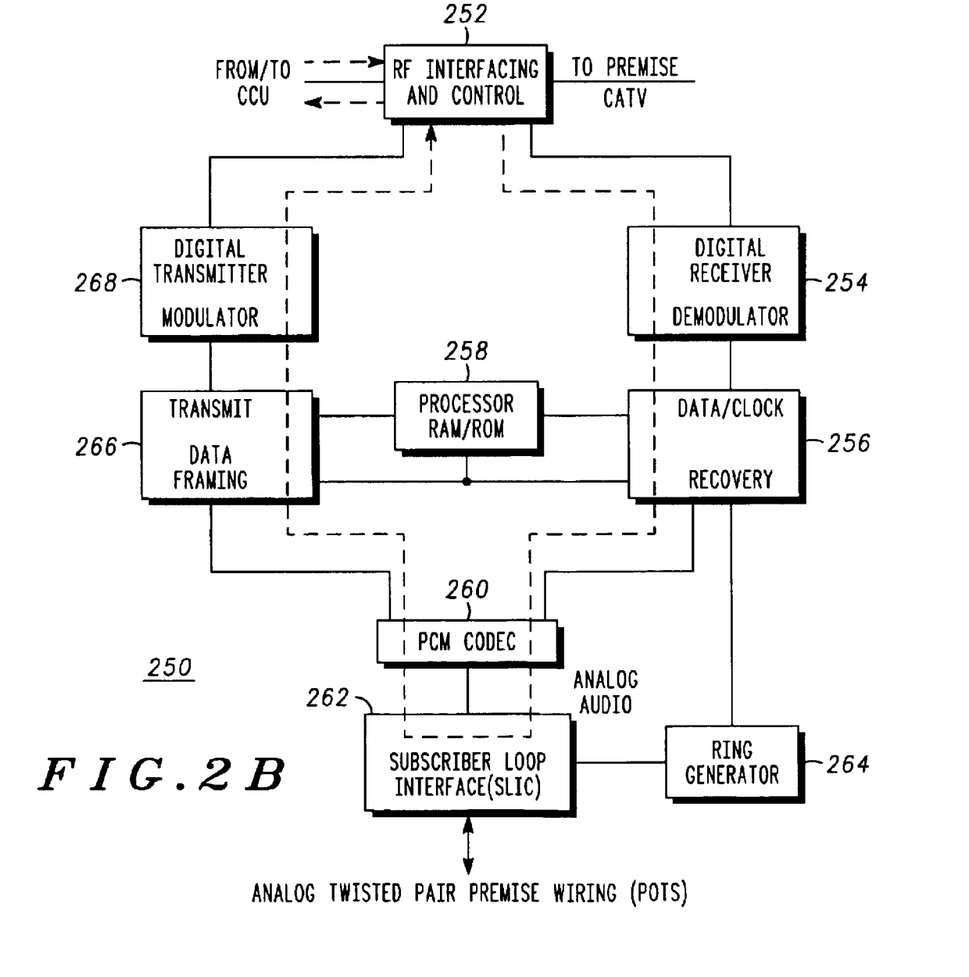
FIG. 2B is a block diagram of components in a cable access unit (CAU) according to the present invention.

With reference now to FIG. 2B, a block diagram of components in a cable access unit (CAU) is depicted according to the present invention. CAU 250 is connected to a hybrid coaxial cable in distribution network 20 in FIG. 1 by RF interfacing and control 252. This interface and control unit provides a 75 ohm interface to the hybrid coaxial cable. RF interfacing and control 252 also provides a connection to cable television equipment on the subscriber premises. Additionally, RF interfacing and control 252 includes a control switch to turn on or off signals to premise cable television systems at the subscriber premises. Data received from the CCU at RF interfacing and control 252 are sent to digital receiver (demodulator) 254. The signals received from the CCU are in a frequency range from about 50 MHz to 750 MHz and converted to a low intermediate frequency (IF) by digital receiver 254. From this form, digital receiver 254 translates the low frequency IF to a baseband π/4 DPQSK modulated signal. Next the signal is demodulated to obtain bits from the signal. Thereafter, data/clock recovery 256 takes the bits from digital receiver 254 and separates the bits to send to processing unit 258 or pulse code modulated (PCM) coder/decoder (codec) 260. Control information is sent to processing unit 258 while user data is sent to PCM codec 260, which converts the user data into an analog form to be passed along to the subscriber's phone.

Processing unit 258 in the depicted example includes one or more microprocessors or digital signal processors (DSPs) along with random access memory (RAM) and ready only memory (ROM). The RAM and ROM contain data and instructions coding for processes performed by the microprocessors or DSPs within processing unit 258. User information is converted by PCM codec 260 to an analog form and sent to subscriber loop interface (SLIC) 262. SLIC 262 provides basic telephony functions, such as indicating whether the phone is ringing or off hook, or whether loop closure has occurred. Additionally, SLIC 262 separates duplex signals into a send signal and a receive signal. SLIC 262 and the functions performed by it are well known to those who are skilled in the art. Ring generator 264 actually provides the voltage used to cause the telephone to ring.

User data from the subscriber premises (such as output form a phone or even output from a standard computer modem) are sent back through SLIC 262 to PCM codec 260, which transforms the data from an analog form to a digital form for processing by transmit data framing 266. Transmit data framing 266 takes raw speech data and puts this data into the frame for transmission to the CCU. For example, transmit data framing 266 includes the necessary synchronization information and calculates the cyclic redundancy code for error checking, which is placed into the slow channel of the frame (as described in more detail below). Transmit data framing 266 is controlled by processing unit 258 and sends signals upstream which are synchronized with the downstream signals. This synchronization in transmit data framing 266 is controlled by data/clock recovery 256. In other words, uplink and downlink transmissions to and from CAU 250 are synchronized. Finally, the data, as a burst, is transmitted by digital transmitter (modulator) 268 to RF interfacing and control 252 and back to the CCU.

Data carried across distribution network 20 in FIG. 1 may include both voice and non-voice data, such as ISDN digital video, phone data, interactive video, or interactive multimedia services. In the present invention, the transport technology used for the cable telephony exchange service is trunked. In other words, a cable telephone traffic channel is not dedicated to one particular user, but is available to all users on the basis of a request for service. Such an arrangement is called multiple access or subscriber loop concentration.

Figure 2C:
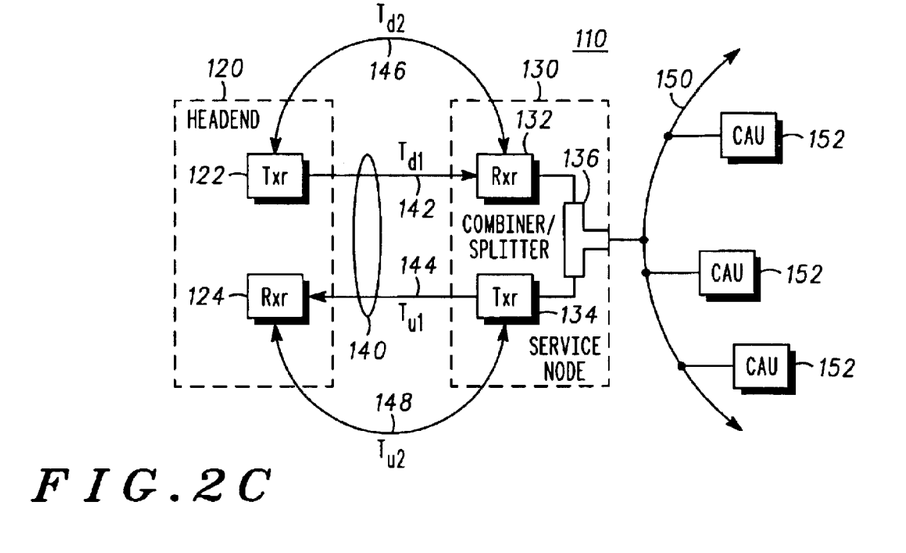
FIG. 2C is a diagram of a telephony system.

FIG. 2C illustrates how a redundant signal line system in a telephony system 110 may be arranged. Under normal operating conditions, a signal stream will route from a head-end 120 to a service node 130 through a signal line loop 140. Signal line loop 140 is defined as two signal lines through which a signal stream is routed, one line, or downstream signal line 142, routing the signal stream from a transmitter 122 in head-end 120 to a receiver 132 of service node 130. A second signal line or upstream signal line 144 is routed from a transmitter 134 of service node 130 to a receiver 124 of head-end 120. An information processor is provided at the head-end 120 of the HFC system 10 for automatically adjusting the timing of the signal stream according to delay parameters determined at the information processor at the head-end 120. The timing adjustment of the signal stream is communicated between the head-end 120 and the communication units, CAUs 16.

A number of communication units 152 are coupled to a cable 150 which is then coupled to a combiner/splitter 136 of service node 130. Service node 130 facilitates communication between the number of communication units 152 and the telephony system 110. In a cable telephony system, the number of communication units 152 will be cable access units attached to a user's premise, be it a home or business, which allow the user two-way communication on the cable network.

As is well recognized, telephony cable lines, such as those making up signal line loop 140, are often buried in the ground. This is usually a relatively safe place for these lines and they remain undisturbed under normal conditions. However, if there is construction anywhere along the length of the line, the line can be damaged or broken causing loss of telephony service to any user connected to that signal line loop. As mentioned earlier, damage to these lines can happen because someone digging in an area is not aware of or careful about the lines, or a natural disaster breaks or damages the line. Failures may also occur in the active fiber optic transmitters and receivers, resulting in loss of service. Since telephony service is considered essential, particularly in times of emergencies, telephony operators build in redundant signal lines. Generally there is a second downstream signal line 146 and a second upstream signal line 148. These redundant signal lines will not follow the same course as the signal lines of signal line loop 140.

If for some reason one or both of the signal lines of signal line loop 140 are damaged, head-end 120 will route the signal stream through one or both of the redundant signal lines. For instance, if downstream signal line 142 is damaged, head-end 120 will route the signal stream through second downstream signal line and back up through upstream signal line 144. Similarly, if upstream signal line 144 is damaged, the upstream path of the signal stream will be through second upstream signal line 148. If both lines of the signal line loop 140 are damaged, the signal stream routes through second downstream signal line 146 and second upstream signal line 148. In any of these cases, an alternate signal line loop is formed.

In the preferred embodiment, each of the signal lines 142, 144, 146, and 148 are optic lines made from fiber optics. A protocol used for the optic lines is a time division multiplexing (TDM) protocol on the downstream and time division multiple access (TDMA) protocol on the upstream. Accordingly, the time through each of the signal lines, or delay time, is important. The time required for the signal stream to route through one of the lines is determined and dependent upon the length of the signal line. Generally, the time required for the signal stream to route through signal line 142 will be nearly the same as the time required for the signal stream to route through signal stream 144 since the two lines are installed along the same route and generally the same length, although not required to be so. However, the time through either of the redundant lines, 146 and 148, will be much greater since the lines must follow a detoured route making the optic lines much longer.

The delay for each of the lines between head-end 120 and user service node 130 in the preferred embodiment is predetermined and stored within head-end 120. The predetermined delay parameters are determined according to the equations:

$$\text{Delay}_0 = d1/u1 = \tau_{d1} + \tau_{u1}$$

$$\text{Delay}_1 = d1/u2 = \tau_{d1} + \tau_{u2}$$

$$\text{Delay}_2 = d2/u1 = \tau_{d2} + \tau_{u1}$$

$$\text{Delay}_3 = d2/u2 = \tau_{d2} + \tau_{u2}$$

where d1 is a length of a first downstream line (142), u1 is a length of a first upstream line (144), d2 is a length of a second downstream line (146), u2 is a length of a second upstream line (148), $\tau_{d1}$ is a propagation delay for d1, $\tau_{d2}$ is a propagation delay for d2, $\tau_{u1}$ is a propagation delay for u1, and $\tau_{u2}$ is a propagation delay for u2. Therefore, if one of the signal line loop 140 lines is unusable for signal stream routing, head-end 120 will cycle through the delay parameters until it finds the delay parameter that corresponds to the alternate signal line loop formed by routing the signal stream through one of the redundant lines.

Head-end 120 must be programmed to automatically detect when one of the lines is unusable, or in other words, when a fault in a line has occurred. If a line goes down, head-end must be able to immediately reroute the signal stream through a redundant line to maintain continuous service to the users. To do so, head-end must be able to detect the fault, preferably independent of the actual rerouting mechanism.

Figure 3:
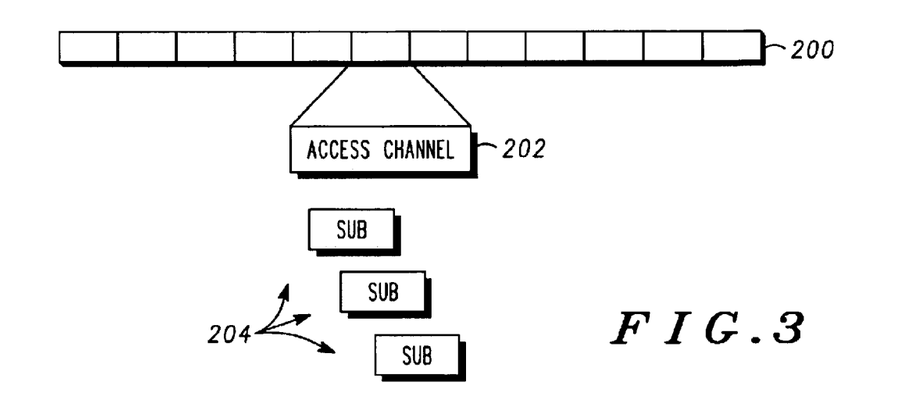
FIG. 3 is a diagram of a system protocol according to an embodiment of the present invention.

FIG. 3 graphically shows how head-end 120 detects a fault in the signal lines according to a preferred embodiment of the present invention. When a given route of the signal stream is established having an associated delay, head-end 120 will expect a response, or time alignment, from the communication units 152 within a predetermined timing window 202. The response which head-end 120 will be looking for is, in the preferred embodiment, shortened uplink bursts (SUBs) (shown as elements 204 in FIG. 3 indicating that the SUBs may be anywhere within predetermined timing window 202) from the communication units 152. In the preferred embodiment, predetermined timing window 202 is an access channel 202 of the system protocol 200 as shown in FIG. 3.

Figure 4:
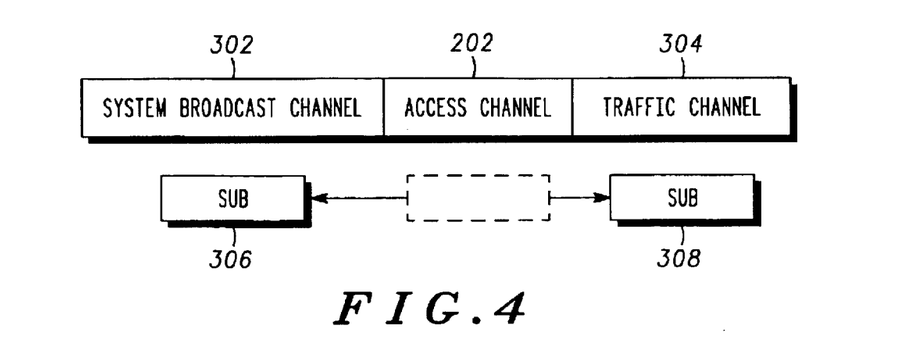
FIG. 4 is a diagram showing a portion of the system protocol of FIG. 3 according to a preferred embodiment of the present invention.

In the event that a signal line is switched, the SUBs will shift either to the left or to the right of predetermined timing window, or access channel, 202 as shown in FIG. 4. In the preferred embodiment, access channel 202 lies between a system broadcast channel 302 and a traffic channel 304. Head-end 120 detects that the SUBs have shifted into the adjacent channels, whether system broadcast channels (indicated by 306) or traffic channels (indicated by 308).

This method of detecting a fault assumes that the head-end receiver can reliably detect that a shift has occurred by detecting the presence of shortened bursts within the adjacent channels. It also assumes that the differential signal line fixed delay is limited to a single slot time. Certainly head-end receivers can be and are designed to recognize short bursts in adjacent channels. Limiting the total fiber round trip differential between any given combination of the signal lines to approximately 60 kilometers maintains any shift in the SUBs to one slot time.

When the downlink signal to the communication units 152 is interrupted requiring a switch to a different signal line during active calls, the active communication units 152 will loose synchronization with the traffic channel 304 at the head-end 120. The active communication unit 152 will attempt to reconnect by sending the SUBs to the head-end 120. If the SUBs are within the predetermined timing window 202, head-end 120 will assign a new time alignment value to the active communication unit 152 and the call will continue.

If head-end 120 detects that the SUBs are out of bounds, it will begin cycling through the delay parameters, one at a time. For each delay parameter, head-end 120 adjusts receiver 124 of head-end 120 to the predetermined timing window to compensate for the new delay parameter. If the new delay parameter does not correlate with the current alternate signal line loop, the return SUBs from the communication units 152 will not be within predetermined timing window 202 and head-end 120 will cycle to the next delay parameter and adjust to the new delay parameter. Head-end 120 cycles through the delay parameters until the SUBs from communication units 152 are within predetermined timing window 202.

If the fault occurred such that the SUB was decoded in the system broadcast channel 302 (left of the predetermined timing window 202), head-end 120 will cycle through the delay parameters backwards through the list (relative to the current delay parameter, where the delay parameters are arranged in order of increasing time delay). If the fault occurred in the traffic channel 304 (right of the predetermined timing window 202), head-end 120 will cycle forwards through the list If the fault occurred within the predetermined timing window 202 (partially within predetermined timing window 202 and partially outside), then the sign of the fault (positive or negative) will determine which direction head-end will cycle through the delay parameters where positive cycles forward and negative cycles backward.

Once head-end 120 has selected the delay parameter correlating with the alternate signal line loop, the fault condition will be cleared and the system 10 will stabilize. The timing adjustment is applied to the receiver 124 of head-end 120.

Figure 5A:
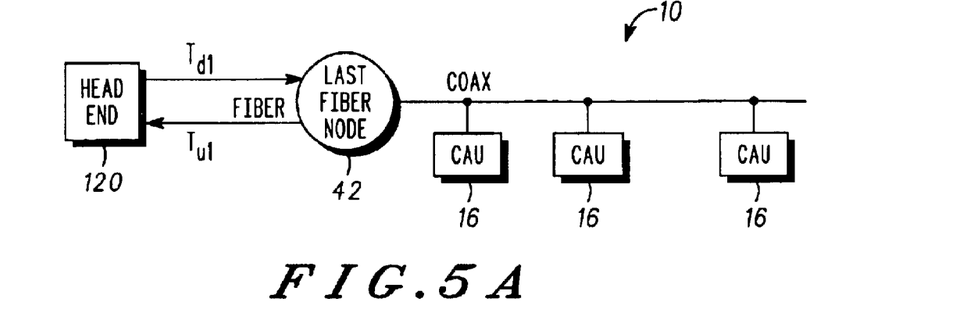
FIGS. 5A and 5B illustrate the round trip delay and the four combination fiber link paths associated with the HFC communication system.

The Automatic Timing Adjustment feature provides a capability allowing the CCU 12 to detect timing faults in received RF bursts from CAUs 16 resulting from fault generated fiber path switches, and to automatically compensate for these faults. The RF delay in the system 10 has two (2) components which, when summed, cannot exceed the maximum HFC system delay value, e.g., 1.66 msec. These two components as shown in FIG. 5A are an operator-entered delay value and an automatically calculated CAU 16 time alignment value. The operator-entered delay value discussed herein is referred to as NR221.

Figure 5B:
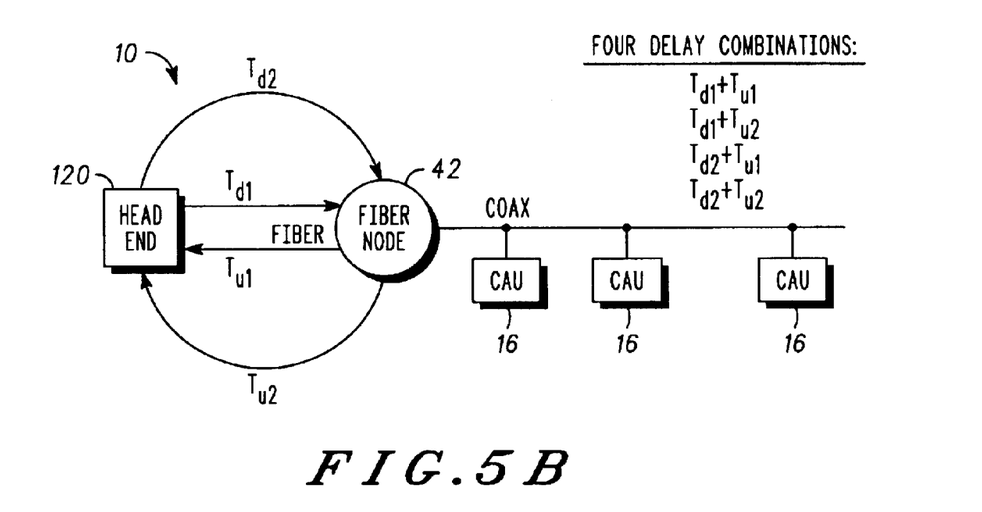

The single NR221 signal delay has been a static value previously provided by the system operator per the serving area. The delay value indicates the delay (in bits) plus a minimum default delay (e.g., 3004 bits) which represents the delay round trip from the CCU 12 to the last fiber node and back to the CCU 12. The CAU 16 time alignment values are dynamically adjusted per CAU 16 when each CAU 16 performs the time alignment procedure (i.e., after each shortened uplink burst on each call, during a ping test). The time alignment delay value is sent from the CCU 12 to the CAU 16 and contains a value (e.g., 0–120) indicating the number of bits the CAU 16 needs to subtract from the difference between the reception of a downlink burst and the transmission of an uplink burst Many customers use multiple paths to route the optical fiber cable from the headend to subscriber units for the upstream and downstream paths. This is done to reduce a single point of failure should a fiber cable be damaged due to construction or a natural disaster. When a fiber path changes, typically, different delay characteristics result because the new path is either longer or shorter. The fiber switching occurs automatically between the two fiber nodes without any notification to the CCU 12. When redundant fiber links with differing delay characteristics are added, the delay must be characterized per path (i.e., all four combinations) as shown in FIG. 5B.

Only one pair of associated uplink and downlink fibers are active at any given time. The other pair remains in a standby state and one of the standby fiber links can be switched into service in the event of a failure. Only one fiber link will be changed at a time. Previous to this feature, the NR221 value had to be changed manually after a fiber switch occurred. When this feature is deployed, the system 10 allows provision of a list of four NR221 delay combinations. The CCU 12 automatically selects the best NR221 delay value following the detection of timing faults in the receive path. The CCU 12 will alarm the operator by a critical alarm if a proper timing correction cannot be made. The CCU 12 will alarm the operator by a warning that a change in NR221 delay was made automatically, which should correspond to a fiber switch event.

As discussed, the fiber switch detection mechanism relies on at least one CAU 16 sending uplink bursts, received by the CCU 12 outside of the System Access Channel, resulting from any traffic call or maintenance scenario. The correction method applies the signal delay adjustment automatically, based on the provisioned list of four possible delays. Specifically, the detection looks for shortened uplink bursts (SUBs) from the CAUs 16 in regions within the SAC channel time slot and the SAC's adjacent time slots. If a SUB is detected by the cable port transceivers (CPXs) outside of the adjustment window of the system access channel, the CPX will report this to the cable port controller (CPC) with the direction of the detection. The CPC will pick a next NR221 value from the list of four in the direction indicated by the CPX as compared with the current delay value. The CPC will report that a new NR221 value has been selected and send a warning that indicates timing adjustments have been made. The CPC will send the new NR221 value to all CPXs 28 in the serving area, where the CPX 28 will change the receive timing window to account for the change in signal delay. After the fiber switch, all CAUs 16 active in a call that can signal in within the adjustment window of the system access channel (SAC) will go through the time alignment procedure and will be allowed to reconnect to the Traffic Channel (TC). However, not until a CAUs 16 signals in outside the adjustment window of the SAC, will the NR221 signal delay value for the serving area be adjusted. CAUs that reconnected prior to the fiber switch detection will have to attempt another time alignment procedure.

As discussed, each of the four delay combinations are sorted from smallest to largest and stored in the CCU 12. In order to access the system, CAUs 16 send in shortened uplink bursts (SUBs) on the SAC. These SUBs must be received within a time alignment window on the SAC. The CAUs 16 also send in SUBs to reconnect during a call if communication is lost. These SUBs are used to detect redundant fiber switchovers. When a SUB is detected outside the time alignment window a fiber switch is reported. A fiber switch will break the communication link with all of the CAUs 16. All CAUs 16 active in a call will send in a SUB as part of the reconnect procedure. The SUBs from many CAUs 16 will still be received in the time alignment window if the difference in the fiber length is small. For the CAUs 16 that do make the window, they will go through a reconnect procedure and will be allowed to reconnect to the traffic channel.

When one of the CAUs 16 that is closest or farthest to the fiber node sends a SUB that falls outside of the adjustment window, the NR221 signal delay value for the serving area will be adjusted by choosing another one of the four values. The new value will be selected based on whether the SUB is received to the left or right of the adjustment window. The current value of NR221 will be located in the list. If the SUB falls to the left of the window, the next smaller value in the list will be chosen as the new NR221. If the SUB falls to the right of the window, the next larger value in the list will be chosen as the new NR221. Once a new NR221 is programmed for the serving area, all CAUs 16 must reconnect, including those that already reconnected to a traffic channel. Depending on the fiber switch, it is possible that one NR221 change will not be the correct value. In this case, when another CAU 16 SUB is received outside the adjustment window of the SAC, a new NR221 value will be selected using the same method described above. It is possible that a total of three NR221 jumps may be necessary. Many CAUs 16 will reconnect multiple times.

The enhanced automatic method will not require the maintenance craftsperson to measure the delay paths. When SUBs are received from CAUs 16, they will contain an ID which is unique to the CAU 16, and the CCU 12 will save the bit offset for each CAU 16. Also, the system will keep track of the bit offsets of the farthest and nearest CAUs 16. When a CAU 16 SUB is received with a bit offset different than the one recorded (greater than 2 bits in either direction), a redundant fiber switch is reported. NR221 will be recalculated according to the difference between the old bit offset and the new bit offset If the old bit offset is larger than the new bit offset, then new_NR221=old_NR221−(old_bit_offset—new_bit_offset)

If the new bit offset is larger than the old bit offset, then new_NR221=old_NR221+(new_bit_offset—old_bit_offset)

Figure 6A:
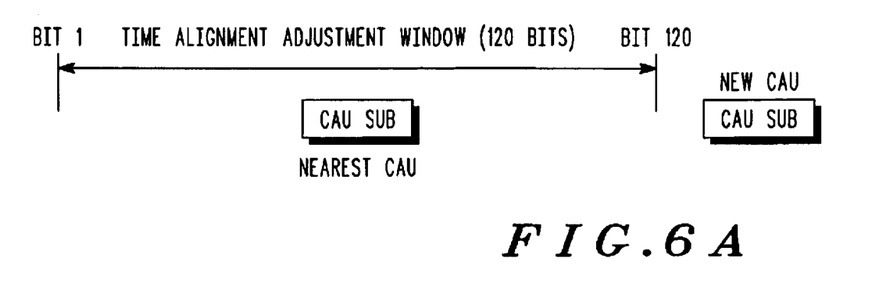
FIGS. 6A and 6B illustrate the positioning of the short uplink burst (SUB) from the cable access units within a time alignment adjustment window in accordance with the invention.

At system initialization, the NR221 delay will be set to the smallest possible value. The CPX 28 will look for SUBs in all time slots, not just the SAC. When the first CAU 16 performs a time alignment, the NR221 window will be shifted by the number of bits necessary to get the SUB into the middle of the adjustment window based on a value in the database. Accordingly, the database facilitates the calculation of delay parameters corresponding to the alternate signal line loop using the database to adjust the timing of the signal stream. Once the CAU SUBs are received within the alignment window of the SAC, its bit offset will be recorded. After the first SUB from a CAU 16 is recorded, only three time slots will be used for fiber switch detection. As shown in FIG. 6A, when a SUB is received from a CAU 16 that falls to the right of the time alignment adjustment window and the CCU 12 does not have a current bit offset stored for the CAU 16, the following steps will occur:

1) Calculate the distance between the new CAU 16 and the nearest CAU 16.
2) If the distance between the new CAU 16 and the nearest CAU 16 is less than the size of the time alignment adjustment window (96 bits), then calculate the new NR221 value that would move the time alignment adjustment window such that the nearest CAU 16 and the new CAU 16 are centered in the window. Change to the new NR221 value, and reset all the bit offsets for the CAUs 16.
3) If the distance between the new CAU 16 and the nearest CAU 16 is greater than the size of the time alignment adjustment window then there are two possibilities:
   a) The new CAU 16 is out of range.
   b) A reroute fiber switch (RFS) has occurred.
   To determine which is true, ping the nearest CAU 16. If the nearest CAU 16 sends in a SUB with the same bit offset as already recorded, then the new CAU 16 is out of range and the user should be alarmed. If the nearest CAU 16 sends in a SUB with a different bit offset, then an RFS has occurred and NR221 will be recalculated as described above.

Figure 6B:
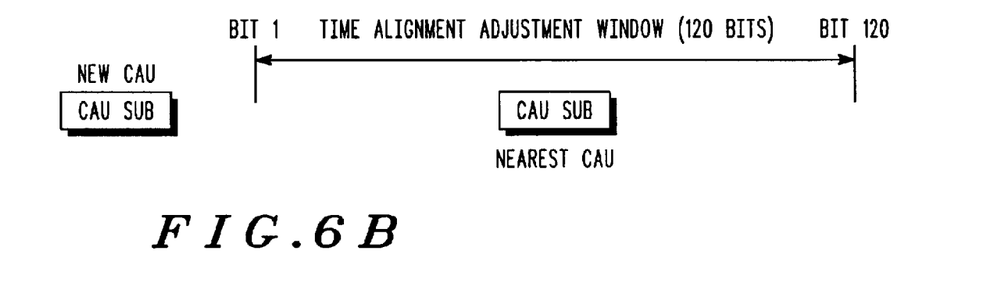

As shown in FIG. 6B, when a SUB is received from a CAU 16 that falls to the left of the time alignment adjustment window and the CCU 12 does not have a current bit offset stored for the CAU 16, the following steps will occur:

1) Calculate the distance between the new CAU 16 and the farthest CAU 16.
2) If the distance between the new CAU 16 and the farthest CAU is less than the size of the time alignment adjustment window (96 bits), then calculate the new NR221 value that would move the time alignment adjustment window such that the new CAU 16 and the farthest CAU 16 are centered in the window. Change to the new NR221 value, and reset all the bit offsets for the CAUs 16.

3) If the distance between the new CAU 16 and the farthest CAU 16 is greater than the size of the time alignment adjustment window then there are two possibilities:
 a) The new CAU 16 is out of range.
 b) An RFS has occurred.

To determine which is true, ping the farthest CAU 16. If the farthest CAU 16 sends in a SUB with the same bit offset as already recorded, then the new CAU 16 is out of range and the user should be alarmed. If the farthest CAU 16 sends in a SUB with a different bit offset, then an RFS has occurred and NR221 will be recalculated as was described.

Figure 7:
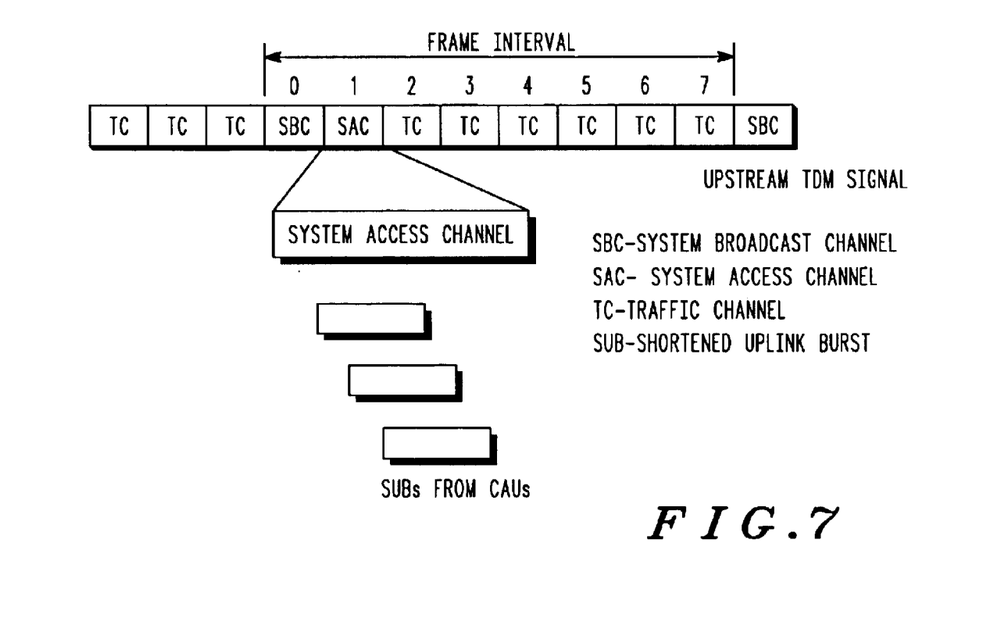
FIG. 7 shows a representative upstream frame of a carrier from a cable access communication system.
Figure 8:
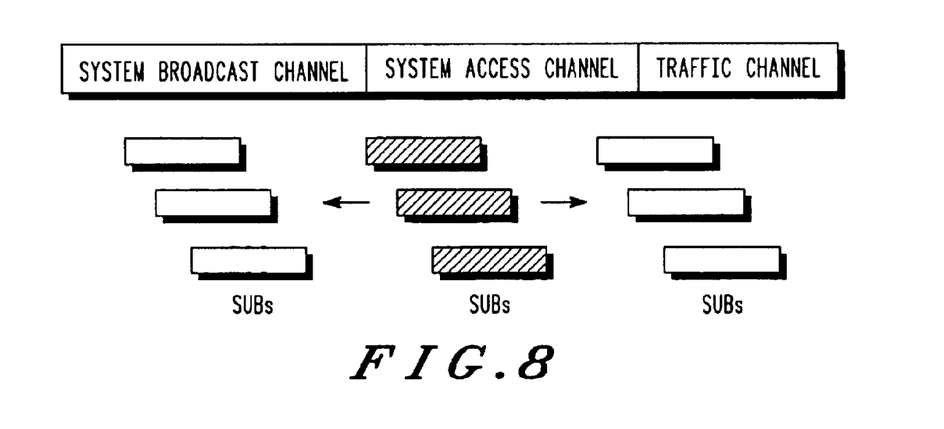
FIG. 8 illustrates the time delay shift of the SUB signals with respect to the communications channels.

The automatic NR221 delay adjustment for detecting a fiber switch in response to a redundant fiber switch requires a robust fault detector for reliable operation. Every CACS scenario interrupted by a fiber switch eventually leads to a CAU 16 sending the SUB to the CCU 12 on the SAC. With reference to FIG. 7, the upstream frame of a carrier containing CACS system channels is shown along with the traffic channels representative of the current configuration. As shown, in a representative allocation of system channels, the system broadcast channel (SBC) could be assigned on either side of the SAC. Since the time alignment procedure occurs on the system access channels, shortened uplink bursts (SUBs) are always positioned within this slot under normal operating conditions. This assumes that the proper timing delay compensation value is used representing the fixed propagation delay of the fibers currently in use. In the event of a fiber switchover, the SUBs will shift either left or right depending on the length (delay) of the new fiber configuration. This is shown in FIG. 8. The CAU SUB will contain a unique ID.

The CCU 12 may poll each subscriber unit in a round robin fashion to determine the status of each CAU 16. The polling is used for detection of a fiber switch, as well as acquiring the general status of each subscriber unit. Thus, a detection may be obtained in a minimal time period. The advantage of the other embodiment of the present invention is that if there are no communication units 152 actively involved in calls, head-end 120 can still detect if a fault has occurred. For instance, in the middle of the night when there are no active calls, a signal line may be interrupted or broken and head-end 120 may correct for timing due to the continuous polling of each of the CAUs for their status.

It should be recognized that the present invention may be used in many different communications systems. All such varied uses are contemplated by the present invention. While there has been described embodiments of the invention with respect to enhanced automatic timing adjustment for alternate routing, it will be clear to one skilled in the art that the invention has applications beyond the cable distribution network environment. Accordingly, it is intended that the scope of the invention including such alternatives, modifications, and variations shall be defined by the appended claims.

What is claimed is:

1. A communication system providing automatic timing adjustment for alternate routing, comprising:
 a signal line loop for routing a signal stream between a head-end and at least one communication unit wherein the at least one communication unit sends a shortened uplink burst (SUB) to the head-end, the SUB containing an ID unique to the at least one communication unit;
 at least one alternate routing signal line coupled between the head-end and the at least one communication unit, said signal stream routing through the at least one alternate routing signal line being provided to form a redundant signal line loop when a fault of the signal stream through the signal line loop is detected; and
 an information processor at the head-end for saving a current bit offset for said at least one communication unit and for all subsequent communication units, and
  for adjusting a timing of the signal stream according to delay parameters calculated at the information processor at the head-end for all subsequent communication units that send a SUB containing a unique ID to the head-end, when a distance between a subsequent communication unit and the nearest communication unit is less than the size of a predetermined alignment window, and
  for recalculating a timing of the signal stream when the distance between a subsequent communication unit and the nearest communication unit is greater than a predetermined alignment window and the SUB from the subsequent communication unit has a bit offset that is greater than a predetermined amount different than the saved bit offset.

2. A system as recited in claim 1 wherein when the distance between a subsequent communication unit and the nearest communication unit is greater than a predetermined alignment window and the SUB from the subsequent communication unit has the same bit offset as the saved bit offset, said information processor provides an alarm signal.

3. A system as recited in claim 2 wherein the predetermined window of the signal stream automatically centers the timing delay.

4. A system as recited in claim 2 wherein the at least one communication unit comprises more than one communication unit beyond the range of the system signal line loop.

5. A system as recited in claim 1 comprising a database associated with the signal line loop for routing the signal stream for detecting at least one alternate routing line facilitating switch detection.

6. A system as recited in claim 5 wherein the signal line loop comprises the first downstream line and the first upstream line.

7. A system as recited in claim 5 wherein the at least one redundant signal line comprises the second downstream line.

8. A system as recited in claim 5 wherein the at least one redundant signal line comprises the second upstream line.

9. A system as recited in claim 1 wherein said signal line loop comprises an optic signal line loop between a head-end and at least one communication unit, and at least one redundant optic signal line coupled between the head-end and the at least one communication unit.

10. A system as recited in claim 9 wherein the optic signal line loop comprises the first optic downstream line and the first optic upstream line.

11. A system as recited in claim 9 wherein the at least one redundant optical signal line comprises the second optic downstream line.

12. A system as recited in claim 9 wherein the at least one redundant optic signal line comprises the second optic upstream line.

13. A communication method providing automatic timing adjustment for alternate routing, comprising the steps of:
 setting a delay parameter to a smallest value;
 detecting a shortened uplink burst (SUB) containing a unique ID of a signal stream from a first communication unit;

shifting the delay parameter to place the signal stream from the first communication unit within the center of a predetermined window;

recording the number of bits necessary to place the SUB in the center of the predetermined window;

detecting a SUB containing a unique ID from a signal stream of a second communication unit; and calculating a distance between the second communication unit and a communication unit nearest the second communication unit;

wherein when the distance calculated in said calculating step is less than or equal to a size of the predetermined window, delay parameters are adjusted so as to center the second communication unit and the nearest communication unit in the predetermined window, and wherein if the distance calculated in said calculating step is greater than the size of the predetermined window, the nearest communication unit is queried to respond with a SUB and, if the SUB has a same bit offset as that recorded, an alarm is provided, and if the SUB has a different bit offset as that recorded, delay parameters are adjusted so as to center the second communication unit and the nearest communication unit in the predetermined window.

* * * * *